(12) United States Patent
Zhu

(10) Patent No.: US 12,180,946 B2
(45) Date of Patent: Dec. 31, 2024

(54) METHOD FOR PROTECTING NOVEL ANTI-DROP SUBMARINE CABLE

(71) Applicant: Guangdong Rich Offshore Wind Power Technology Co., Ltd, Guangdong (CN)

(72) Inventor: Ronghua Zhu, Guangdong (CN)

(73) Assignee: Guangdong Rich Offshore Wind Power Technology Co., Ltd, Guangdong (CN)

( * ) Notice: Subject to any disclaimer, the term of this patent is extended or adjusted under 35 U.S.C. 154(b) by 170 days.

(21) Appl. No.: 17/893,203

(22) Filed: Aug. 23, 2022

(65) Prior Publication Data

US 2023/0272784 A1   Aug. 31, 2023

(30) Foreign Application Priority Data

Feb. 28, 2022   (CN) ......................... 202210186875.X

(51) Int. Cl.
*F03D 13/25*       (2016.01)
*F03D 80/80*       (2016.01)
(Continued)

(52) U.S. Cl.
CPC ............. *F03D 80/85* (2016.05); *F03D 13/25* (2016.05); *F16L 57/02* (2013.01); *H02G 1/10* (2013.01);
(Continued)

(58) Field of Classification Search
CPC . F16L 57/02; H02G 1/10; E02D 27/52; F03D 13/25; F03D 80/85; E02B 2017/0091
See application file for complete search history.

(56) References Cited

U.S. PATENT DOCUMENTS

| | | | |
|---|---|---|---|
| 9,249,899 B2 * | 2/2016 | Bang-Andresen | H02G 1/10 |
| 9,599,254 B2 * | 3/2017 | Ramslie | H02G 9/02 |

(Continued)

FOREIGN PATENT DOCUMENTS

| | | | | |
|---|---|---|---|---|
| AU | 2021227416 A1 * | 9/2022 | ............ | F03D 13/10 |
| CN | 208933997 U * | 6/2019 | | |

(Continued)

*Primary Examiner* — Frederick L Lagman
(74) *Attorney, Agent, or Firm* — JCIPRNET

(57) ABSTRACT

A method for protecting a novel anti-drop submarine cable includes: assembling a traction assembly, a standard bending protection section and a protection reinforcement section sequentially to form a submarine-cable-protection device, and a submarine cable passing through it; connecting a traction rope of the traction assembly to a reserved traction rope pre-buried in a single pile foundation, and enabling the submarine cable and the submarine-cable-protection device by a traction device passing through a reserved hole of the foundation; moving the assembled sets forward until the traction rope is lifted and unmovable, enabling a retaining ring of the protection reinforcement section to abut against the reserved hole, installing the traction rope on the foundation by shackles; pulling the reserved traction rope to a proper length, fixing the submarine cable to installation base. The safety is ensured by avoiding dropping of the submarine-cable-protection device, and ensures the over-bending protection of the submarine cable.

8 Claims, 3 Drawing Sheets

(51) Int. Cl.
*F16L 57/02* (2006.01)
*H02G 1/10* (2006.01)
E02B 17/00 (2006.01)
E02D 27/52 (2006.01)

(52) U.S. Cl.
CPC ...... *E02B 2017/0091* (2013.01); *E02D 27/52* (2013.01); *F05B 2240/95* (2013.01)

(56) References Cited

U.S. PATENT DOCUMENTS

| | | |
|---|---|---|
| 10,199,808 B2 * | 2/2019 | Bang-Andreasen ..... H02G 1/10 |
| 11,031,756 B2 * | 6/2021 | Bang-Andreasen ... H02G 1/081 |
| 2011/0226527 A1 * | 9/2011 | Ritchie-Bland ......... F16L 35/00 |
| | | 174/669 |
| 2020/0271263 A1 * | 8/2020 | Hughes ................... F03D 80/85 |
| 2020/0325646 A1 * | 10/2020 | Harbison ................ H02G 1/081 |
| 2020/0412110 A1 * | 12/2020 | Van Hinsbergh ....... F03D 80/85 |
| 2022/0235744 A1 * | 7/2022 | Soerensen ................ E02B 17/00 |

FOREIGN PATENT DOCUMENTS

| | | | | |
|---|---|---|---|---|
| CN | 114008880 A | * | 2/2022 | ............ E02B 17/00 |
| EP | 3086424 A1 | * | 10/2016 | ............... H02G 1/10 |
| WO | WO-2011141494 A1 | * | 11/2011 | ........... E02B 17/027 |

* cited by examiner

METHOD FOR PROTECTING NOVEL ANTI-DROP SUBMARINE CABLE

CROSS-REFERENCE TO RELATED APPLICATION

This application claims the priority benefit of China application serial no. 202210186875.X, filed on Feb. 28, 2022. The entirety of the above-mentioned patent application is hereby incorporated by reference herein and made a part of this specification.

FIELD OF TECHNOLOGY

The present invention belongs to the field of offshore wind power engineering, and in particular relates to a method for protecting a novel anti-drop submarine cable.

BACKGROUND

As the most basic guarantee for the normal operation of offshore wind farms, submarine cables are provided with a variety of submarine cable protection solutions for key locations prone to submarine cable damage, such as a bent section from a submarine mud surface to a wind turbine foundation. At present, a bend limiter with a latch is generally used for a bored single pile foundation free of a J-shaped pipe. Up to now, these submarine cable protection devices have been damaged to varying degrees during actual operation. For example, a Half structure of an anti-bend section is broken and drops during installation and usage, resulting in failure of the entire bend limiter due to dropping. In addition, under the action of long-term circulation of waves and currents, the entire device is likely to drop from the wind turbine foundation because of the non-rigid connection between this type of bend limiter and the wind turbine foundation, causing failure of the protection device.

SUMMARY

Provided is a method for protecting a novel anti-drop submarine cable, the method achieving the protection of the submarine cable by a submarine cable protection device, the submarine cable protection device including a traction assembly, a standard bending protection section and a protection reinforcement section, the method including the following specific steps:

S1: connecting and assembling the traction assembly, the standard bending protection section and the protection reinforcement section in sequence to form the submarine cable protection device, and enabling a submarine cable to pass through the submarine cable protection device to complete the assembly;

S2: connecting a traction rope at a front end of the traction assembly to a reserved traction rope pre-installed in a single pile foundation, and turning on a traction device for the single pile foundation to enable the submarine cable and the submarine cable protection device to pass through a reserved hole of the single pile foundation;

S3: continuing to move the submarine cable protection device and the submarine cable forward by the traction device until the traction rope is lifted by a force and cannot move forward, then enabling a retaining ring at a rear end of the protection reinforcement section to abut against an outer wall of the reserved hole, and installing the traction rope on the single pile foundation by shackles; and S4: continuing to pull the reserved traction rope to pull the submarine cable to a proper length, and installing and fixing the submarine cable to a submarine cable installation base.

Further, the pore diameter of the retaining ring is larger than the pore diameter of the reserved hole, such that the protection reinforcement section cannot completely pass through the reserved hole.

Further, the protection reinforcement section has an outer wall covered with high-strength polyurethane, and is internally provided with reinforcement fibers and/or steel wires to enhance the stress performance of the protection reinforcement section.

Further, a reserved length is set for the protection reinforcement section, such that the protection reinforcement section is inserted into the single pile foundation from the reserved hole by a certain distance, thereby avoiding over-bending of the submarine cable during installation.

Further, the submarine cable installation base is arranged at the top of the single pile foundation, and the submarine cable is moved to the submarine cable installation base by the traction device and then is fixedly installed on the submarine cable installation base.

Further, the submarine cable installation base is provided with a fixed flange, the shackles are installed on the submarine cable installation base by the fixed flange, and the traction rope is connected to the shackles.

DETAILED DESCRIPTION OF THE EMBODIMENTS

In order to make up for the deficiencies in the prior art, the present invention designs and provides a technical solution of a method for preventing a novel anti-drop submarine cable, which is simple in structure, convenient to install, and safe and effective.

The present invention is further described below in conjunction with the accompanying drawings.

Figure 1:
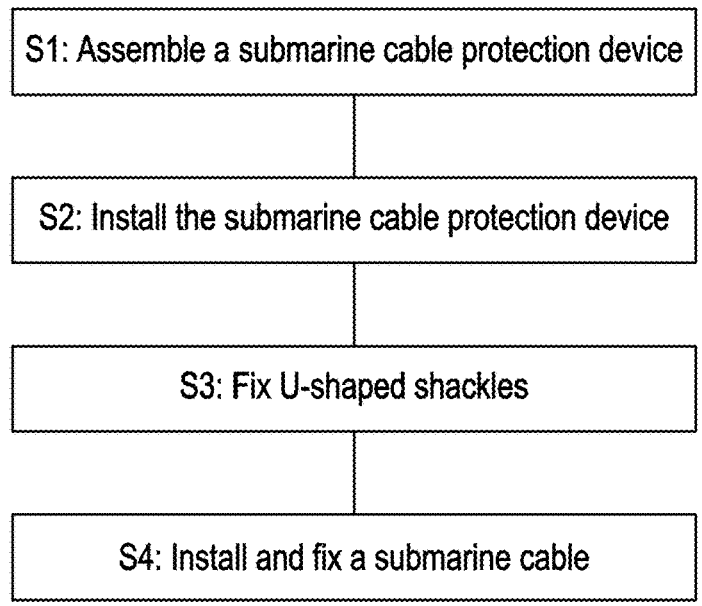
FIG. 1 is a flow chart of a protection method in the present invention.
Figure 2:
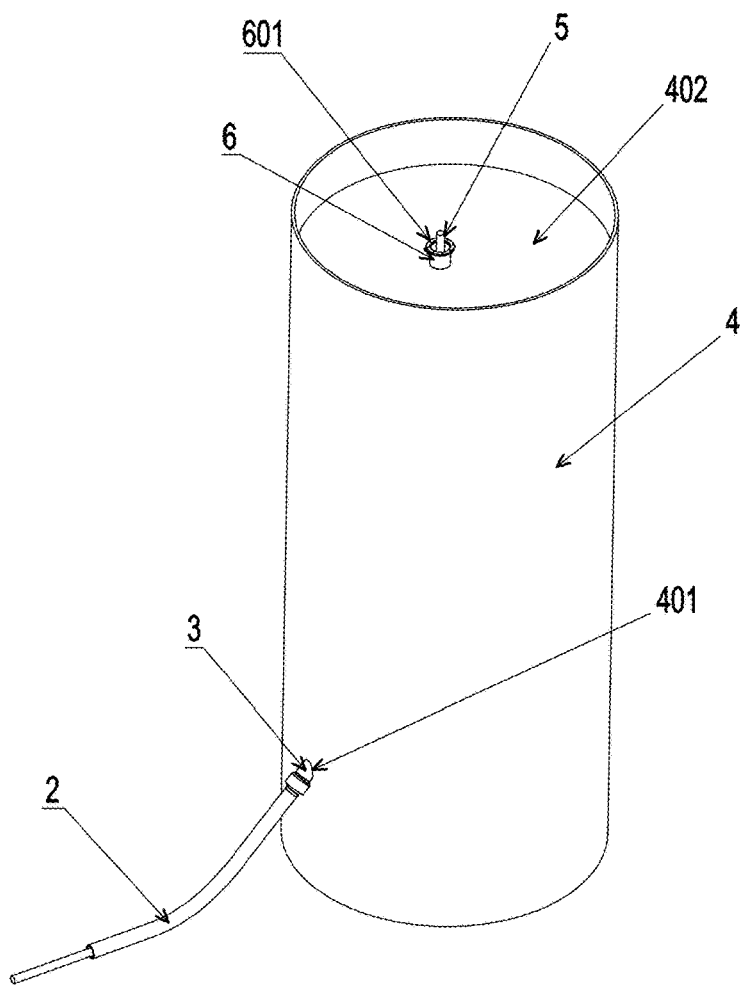
FIG. 2 is a schematic installation diagram of a protection device in the present invention.
Figure 3:
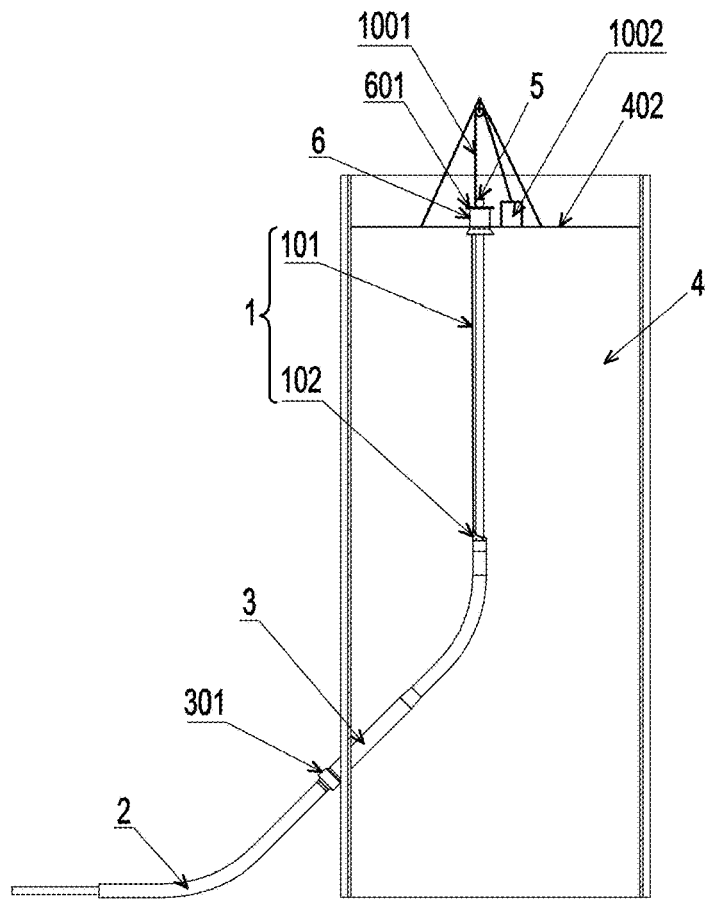
FIG. 3 is a post-installation cross-sectional view of the protection device in the present invention.
Figure 4:
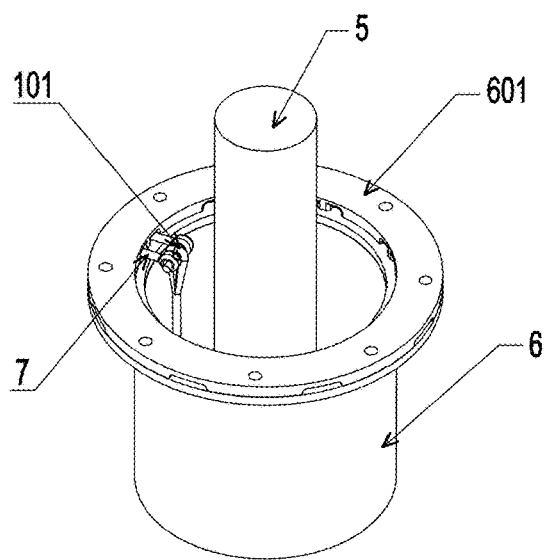
FIG. 4 is a schematic diagram of an installation structure of a submarine cable installation base.
Figure 5:
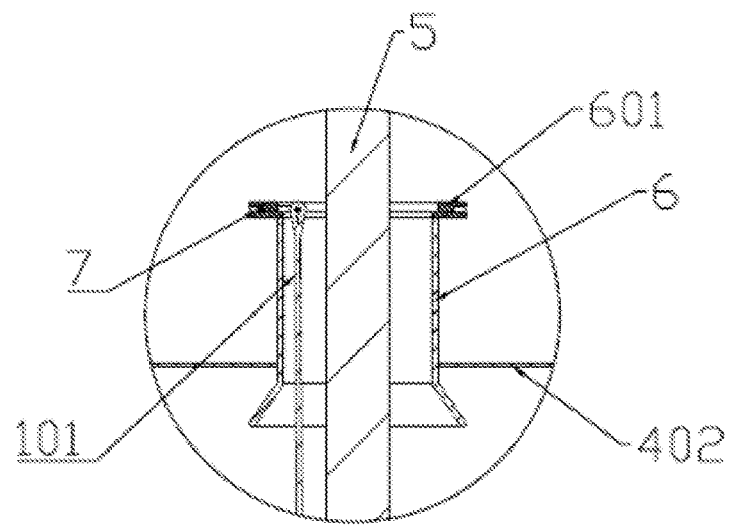
FIG. 5 is a post-installation cross-sectional view of the submarine cable installation base.
Figure 6:
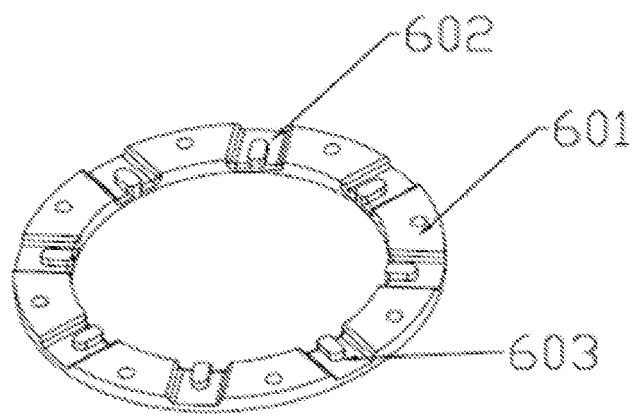
FIG. 6 is a schematic structural diagram of a fixed flange.
Figure 7:
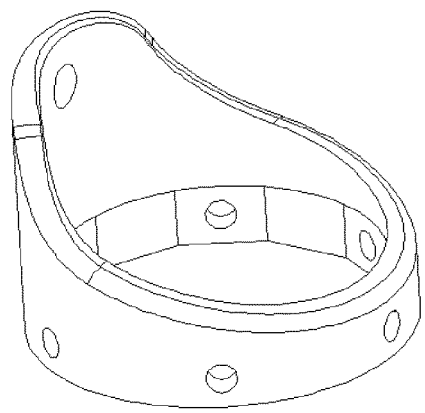
FIG. 7 is a schematic structural diagram of a traction joint.

As shown in FIGS. 1-7, provided is a method for protecting a novel anti-drop submarine cable. the method helps achieving the protection of the submarine cable by a submarine cable protection device, and the submarine cable protection device includes a traction assembly 1, a standard bending protection section 2 and a protection reinforcement section 3. the method includes the following specific steps:

S1: The traction assembly 1, the standard bending protection section 2 and the protection reinforcement section 3 are connected and assembled in sequence to form the submarine cable protection device, and a submarine cable 5 is enabled to pass through the submarine cable protection device to complete the assembly;

S2: A traction rope 101 at a front end of the traction assembly 1 is connected to a reserved traction rope 1001 pre-installed in a single pile foundation 4, and a traction device 1002 for the single pile foundation is turned on to enable the submarine cable 5 and the submarine cable protection device to pass through a reserved hole 401 of the single pile foundation 4;

S3: The submarine cable protection device and the submarine cable continue to move forward by the traction device 1002 until the traction rope 101 is lifted by a force and cannot move forward, at this time, a retaining ring 301 at a rear end of the protection reinforcement section 3 is enabled to abut against an outer wall of the reserved hole 401, and the traction rope 101 is installed on the single pile foundation by shackles 7. The pore diameter of the retaining ring 301 is larger than the pore diameter of the reserved hole 401, such that the protection reinforcement section 3 cannot completely pass through the reserved hole 401;

S4: The reserved traction rope 1001 continues to be pulled to pull the submarine cable to a proper length, and then the submarine cable is installed and fixed to a submarine cable installation base.

The protection reinforcement section 3 has an outer wall covered with high-strength polyurethane, and is internally provided with reinforcement fibers and/or steel wires to enhance the stress performance of the protection reinforcement section. A reserved length is set for the protection reinforcement section 3, such that the protection reinforcement section 3 is inserted into the single pile foundation from the reserved hole, and extends to a front end of the standard bending protection section 2 but does not exceed the standard bending protection section 2.

The submarine cable installation base 6 is arranged on a platform in the top of the single pile foundation, and the submarine cable is moved to the submarine cable installation base 6 by the traction device 1002 and then is fixedly installed on the submarine cable installation base 6. The submarine cable installation base 6 is provided with a fixed flange 601, the shackles 7 are installed on the submarine cable installation base 6 by the fixed flange 601, and the traction rope is connected to the shackles 7.

The structure of the submarine cable protection device is further described with reference to FIGS. 2-7. The protection device for the anti-drop submarine cable is applied to the single pile foundation 4 with the top in which the installation platform 402 is arranged, the installation platform 402 is provided with the submarine cable installation base 6, a side wall of the single pile foundation 4 is formed with the reserved hole 401, the protection reinforcement section 3 is arranged in the reserved hole 401, a front end of the protection reinforcement section 3 is installed with the standard bending protection section 2, the submarine cable 5 passes through the protection reinforcement section 3 and the standard bending protection section 2 and then is connected to the submarine cable installation base 6, an end part of the standard bending protection section 2 is provided with a traction joint 102, the traction joint 102 is fixedly provided with the traction rope 101, and the other end of the traction rope 101 is fixedly arranged on the submarine cable installation base 6. An end part of the protection reinforcement section 3 is provided with a retaining ring 301. The traction joint 102 is fixedly sleeved on the end part of the standard bending protection section 2, and has a top end provided with a bulge structure, and the bulge structure is formed with a connecting hole, and the traction rope 101 is fixedly connected with the connecting hole.

The protection reinforcement section 3 is internally provided with reinforcement fibers and/or steel wires to enhance the stress performance of the protection reinforcement section 3. An outer wall of the protection reinforcement section 3 is covered with a high-strength polyurethane material with certain wear resistance and toughness to form a polyurethane layer, and the pore diameter of the protection reinforcement section 3 is larger than the pore diameter of the reserved hole 401. Under the action of an external force, the protection reinforcement section can be compressed to a certain extent, finally passes through the reserved hole 401 in the single pile foundation 4, and form a certain fixed frictional force with an inner wall of the reserved hole. In view of the possibility of extension of the traction rope 101 fixed on the installation platform 2 under the action of long-term tension, a certain perforation length is reserved for the protection reinforcement section 3, that is to say, the protection reinforcement section 3 extends into an inner cavity of the single pile foundation to adapt to the extension of the traction rope 101.

An upper side of the submarine cable installation base 6 is fixedly provided with the fixed flange 601, the fixed flange 601 is provided with the U-shaped shackles, and the traction rope 101 is connected to the U-shaped shackles. A plurality of sets of installation grooves 602 are annularly distributed in the fixed flange 601, limit blocks 603 are arranged in the installation grooves 602, the limit blocks 603 are arranged close to an inner ring of the fixed flange 601, and the U-shaped shackles 7 are assembled in the installation grooves 602.

The protection device for the anti-drop submarine cable is designed as a whole, which can effectively avoid the problems such as breaking and dropping of a traditional Half structure; the submarine cable protection device is fixed by adopting the traction rope, which can effectively prevent the submarine cable protection device from dropping, and ensure the safe use of the submarine cable protection device and overbending protection of the submarine cable; the submarine cable protection device has few parts and is convenient and fast to install; and the entire device is detachable and convenient to maintain.

When using the device, the traction rope 101, the traction joint 102, the protection reinforcement section 3 and the standard bending protection section 2 are assembled on a submarine cable laying ship firstly; and then the traction rope 101 is connected with the reserved traction rope 1001 pre-installed in the single pile foundation 4. Further, the entire submarine cable protection device passes through the reserved hole 401 of the single pile foundation by the traction device 1002 of the single pile foundation 4 and is installed to a preset position. When the traction rope 101 is under an increased force and cannot move forward, and the retaining ring 301 at the end part of the protection reinforcement section 3 pushes against the outer wall of the reserved hole 401, the traction rope 101 is fixed by the U-shaped shackles 7 and the fixing flange 601 to the submarine cable installation base 6 on the platform 2 in the single pile foundation.

Compared with the prior art, the present invention has the following advantages:

Firstly, a Half structure can be effectively prevented from being broken and dropping, and the entire protection device can be effectively prevented from dropping from a wind turbine foundation, thereby ensuring the safe and effective use of the submarine cable protection device; secondly, the submarine cable protection device has few parts and is convenient and fast to install; and finally, the protection device for the novel anti-drop submarine cable is convenient to disassemble, thereby facilitating the later operation and maintenance of the protection device and the submarine cable.

What is claimed is:

1. A method for protecting a novel anti-drop submarine cable, the method achieving the protection of the submarine cable by a submarine cable protection device, the submarine cable protection device comprises:
   a traction assembly;
   a standard bending protection section; and
   a protection reinforcement section, the method includes:
   connecting and assembling the traction assembly, the standard bending protection section and the protection reinforcement section in sequence to form the submarine cable protection device, and enabling a submarine cable to pass through the submarine cable protection device to complete the assembly;
   connecting a traction rope at a front end of the traction assembly to a reserved traction rope pre-installed in a single pile foundation, and turning on a traction device for the single pile foundation to enable the submarine cable and the submarine cable protection device to pass through a reserved hole of the single pile foundation;
   continuing to move the submarine cable protection device and the submarine cable forward by the traction device until the traction rope is lifted by a force and cannot move forward, then enabling a retaining ring at a rear end of the protection reinforcement section to abut against an outer wall of the reserved hole, and installing the traction rope on the single pile foundation by shackles; and
   continuing to pull the reserved traction rope to pull the submarine cable to a proper length, and installing and fixing the submarine cable to a submarine cable installation base.

2. The method for protecting a novel anti-drop submarine cable according to claim 1, wherein a pore diameter of the retaining ring is larger than a pore diameter of the reserved hole, such that the protection reinforcement section cannot completely pass through the reserved hole.

3. The method for protecting a novel anti-drop submarine cable according to claim 1, wherein the protection reinforcement section has an outer wall covered with high-strength polyurethane, and is internally provided with reinforcement fibers and/or steel wires to enhance the stress performance of the protection reinforcement section.

4. The method for protecting a novel anti-drop submarine cable according to claim 1, wherein a reserved length is set for the protection reinforcement section, such that the protection reinforcement section is inserted into the single pile foundation from the reserved hole by a certain distance, thereby avoiding overbending of the submarine cable during installation.

5. The method for protecting a novel anti-drop submarine cable according to claim 2, wherein a reserved length is set for the protection reinforcement section, such that the protection reinforcement section is inserted into the single pile foundation from the reserved hole by a certain distance, thereby avoiding overbending of the submarine cable during installation.

6. The method for protecting a novel anti-drop submarine cable according to claim 3, wherein a reserved length is set for the protection reinforcement section, such that the protection reinforcement section is inserted into the single pile foundation from the reserved hole by a certain distance, thereby avoiding overbending of the submarine cable during installation.

7. The method for protecting a novel anti-drop submarine cable according to claim 1, wherein the submarine cable installation base is arranged at the top of the single pile foundation, and the submarine cable is moved to the submarine cable installation base by the traction device and then is fixedly installed on the submarine cable installation base.

8. The method for protecting a novel anti-drop submarine cable according to claim 7, wherein the submarine cable installation base is provided with a fixed flange, the shackles are installed on the submarine cable installation base by the fixed flange, and the traction rope is connected to the shackles.

\* \* \* \* \*